May 2, 1939.　　　A. ROZMARICH　　　2,156,354
RADIUS CUTTING TOOL
Filed April 10, 1937　　　3 Sheets—Sheet 3

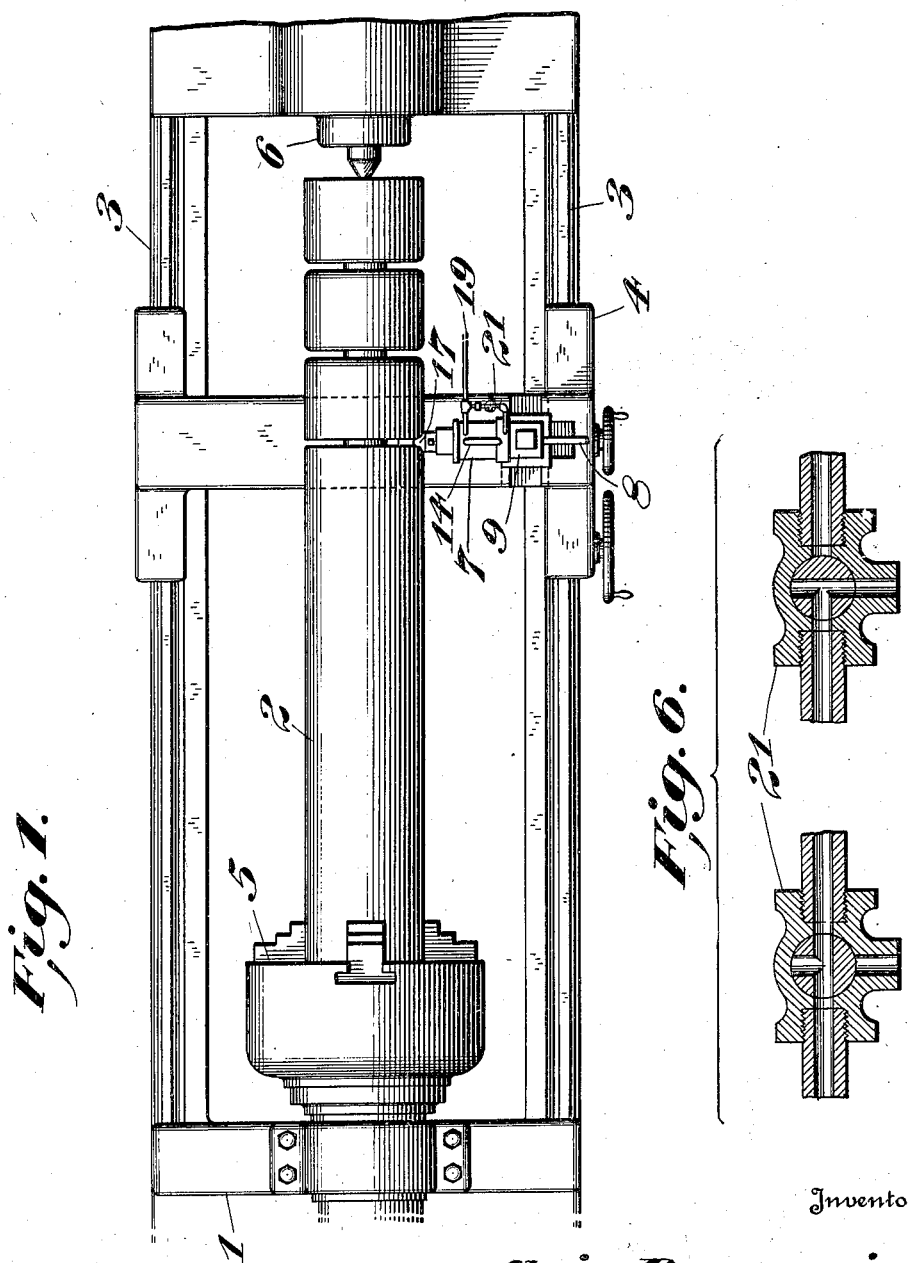

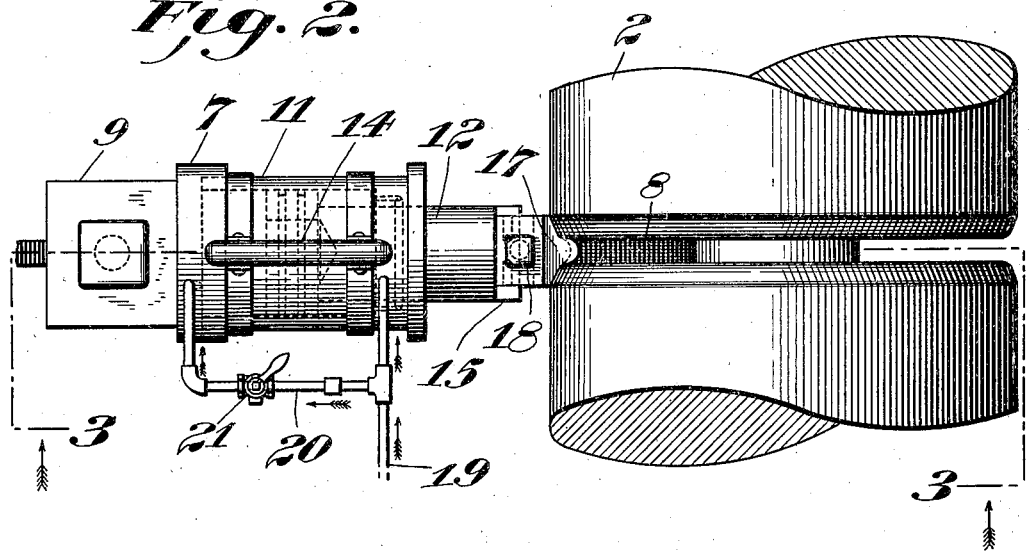
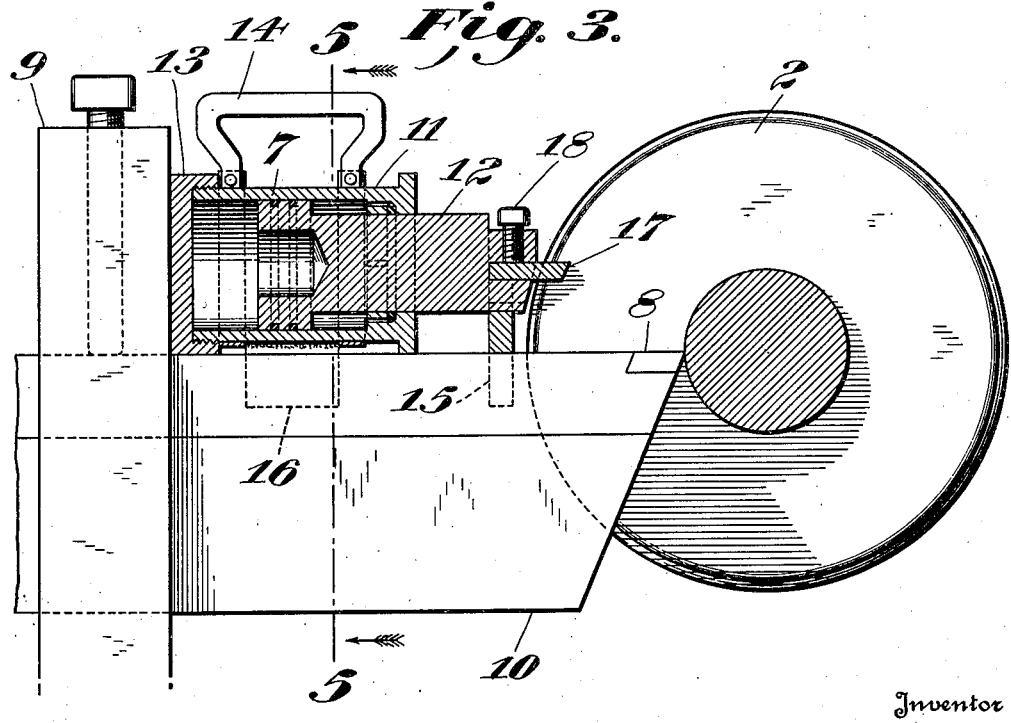

Inventor
Alois Rozmarich
By R. S. A. Dougherty
Attorney

Patented May 2, 1939

2,156,354

UNITED STATES PATENT OFFICE 2,156,354

RADIUS CUTTING TOOL

Alois Rozmarich, Westmont, Pa., assignor to Bethlehem Steel Company, a corporation of Pennsylvania Application April 10, 1937, Serial No. 136,125

7 Claims. (Cl. 82—25)

This invention relates to the means and method for producing chamfered blanks used in the manufacture of forged steel wheels.

It is always desirable in an upset forging operation of this character to start with blanks free from sharp corners. When using hot sheared blanks the action of the saw blades produce the desired result, but with the use of slicers on cold stock sharp edges are produced.

The object of this invention is to provide a radius cutting tool for removing these sharp edges which acts in conjunction with the slicing or grooving tool.

The difficulty experienced in removing the sharp edges of the stock with set tools, after the grooving operation, is due to the fact that rounds rolled in a rough break-down mill are apt to have non-uniform curvature and run eccentric in the slicing lathe thus making it impossible to approach a true corner radius in this manner.

The essence of this invention resides in apparatus for supporting and rotating a long piece of solid stock provided with one or more slicing or grooving tools for partially severing the stock transversely its axis into a plurality of equal length blanks, and providing a portable radius cutting or chamfering tool, mounted on the slicing tool, which acts under yielding pressure so as to follow up or conform to the eccentricity of the stock for removing the sharp edges of the material resulting from the slicing operation. The slicing and chamfering operations being effected at the same time. After the stock has been partially severed into a plurality of blanks and the chamfering of the edges of the blanks is completed the stock is removed from the machine and broken at its unsevered portions to separate the blanks.

The accompanying drawings illustrate one form of mechanism by means of which this method of forming blanks and removal of their edges may be successfully practiced.

Fig. 1 is a plan view of a lathe supporting a piece of stock partially severed at a plurality of points to form blanks, with the chamfering device in operative position over the grooving tool.

Fig. 2 is an enlarged plan view of the chamfering device mounted above the grooving tool.

Fig. 3 is a sectional elevation taken on lines 3—3 of Fig. 2.

Fig. 6 represents two positions of the fluid pressure control valve. The view at the left shows the position of the valve when the cutter is operating on the stock, while the view at the right shows the position of the valve for retracting the cutter.

Figure 4:
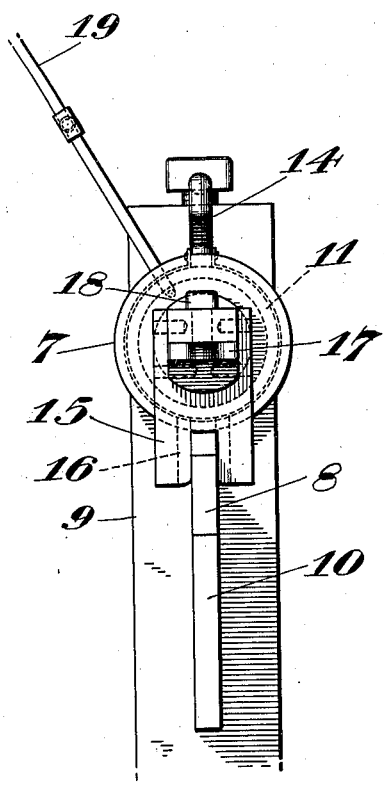
Fig. 4 is an end view of the chamfering device portably mounted on the grooving tool.

Referring now to the characters of reference on the drawings: 1 is the bed of a lathe or other similar machine tool adapted to support and rotate the stock 2; 3 are the slides or ways; 4 is the sliding tool carriage with its transversing and feed mechanism; 5 is the lathe chuck; 6 is the tail stock; 7 is the radius cutting or chamfering device mounted on the grooving tool 8.

Referring to Figs. 2 and 3, 9 is the tool post for mounting the grooving tool; 10 is a bar for supporting the tool 8 which has its cutting edge positioned substantially at the axis of the stock 2. Thus far the description is that of an ordinary lathe. The chamfering device generally indicated by numeral 7 consists of a pressure cylinder 11, piston 12, cap 13, handle 14, front piston clip 15, rear cylinder clip 16, the double edged chamfering tool 17, and set screw 18 for securing the chamfering tool to the piston; 19 is a main fluid pressure supply pipe extending to the front end of the cylinder; 20 is a pipe extension leading from the main supply to the rear end of the cylinder; 21 is a 3-way control valve for reversing the movement of the piston.

Figure 5:
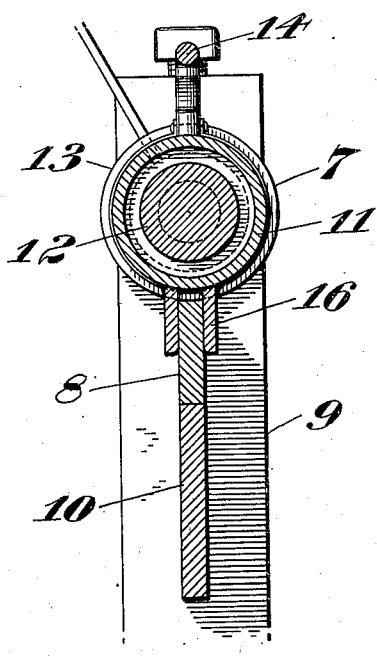
Fig. 5 is a cross section of the pressure cylinder taken on line 5—5 of Fig. 3.

From Figs. 3, 4 and 5 it will be obvious that by means of the depending clips 15 and 16 straddling the tool 8 that the chamfering device 7 as a whole can be easily and quickly applied to or removed from its operative position on top of the tool. This change is made possible by means of flexible tubing, not shown, connected to supply pipe 19.

In operation the rough stock is properly chucked in the lathe in the usual manner and a slicing cut is started near tail stock. After the slicing tool 8 has penetrated the stock for a depth of about 1½" the chamfering device 7 is slipped onto the top of the slicer and the valve 21 is set in the position as shown at the left in Fig. 6. Due to the difference in effective area between the rear and front ends of the piston 12 the piston will tend to move outwardly in the direction of the work and the chamfering tool 17 engage the groove produced by the slicing tool 8. The yieldingly pressed tool will then proceed to remove the sharp edges of the stock formed by the slicing tool. After the edges have been properly chamfered the valve 21 is turned to the position at the right in Fig. 6. This shuts off the pressure to the rear end of the piston and allows the fluid to escape as the pressure on the front end of the piston causes it to move inwardly away from the work. The slicing operation is then continued until only enough stock remains for supporting the stock. In this manner the slicing and chamfering operations are effected simultaneously. After the chamfering is completed the chamfering device may be removed from the slicing tool by hand and the slicing continued. Spacing pieces, not shown, may be placed between the tool post 9 and the cylinder cap 13 for properly positioning the tool when cutting stock of small diameter.

By means of the double acting fluid pressure cylinder the piston moves forward or recedes as the eccentric portions of the stock press against the double edged cutter, thus resulting in a satisfactory radius all around the edges of the partially severed blank and also the stock.

The fact that the chamfering tool is portable and does not require any fastening down is of great economic value in that but one chamfering machine for each lathe is required regardless of the number of cuts made. While I have shown but one slicing tool in operation it is to be understood that more than one such tool may be used simultaneously in gang formation should it be desired to make more than one cut at a time, and that the chamfering tool can be moved from cut to cut without interfering with the slicing operation of a plurality of slicing tools.

Having thus described my invention, what I claim and desire to secure by Letters Patent is:

1. In a machine for making chamfered forging blanks, means for supporting and rotating a length of solid stock, means for transversely grooving the stock to partially sever same into blanks, and a chamfering tool yieldably mounted on said grooving means for engagement with the peripheral edges of the stock formed by said groove for removing said edges.

2. In a machine for making chamfered forging blanks, means for supporting and rotating a length of stock, means for transversely grooving the stock, and a resiliently mounted chamfering tool cooperating with said grooving means for engagement with the peripheral edges of the grooved stock for removing said edges, said grooving and chamfering means being adapted to work on the stock simultaneously.

3. In a machine for making chamfered forging blanks, means for supporting and rotating a length of stock, means for transversely grooving the stock to partially sever same, and a portable chamfering tool mounted on said grooving means for yielding engagement with the edges of the grooved stock and operable with the grooving means.

4. In a machine for making chamfered forging blanks, means for supporting and rotating a length of stock, means for transversely grooving the stock to partially sever the same into blanks, and a fluid pressure chamfering device portably mounted on said grooving means for removing the peripheral edges of the stock and blank formed by said grooving means.

5. In a machine for making chamfered forging blanks, means for supporting and rotating a length of solid stock, means for transversely grooving the stock to partially sever the same into blanks, a chamfering tool positioned above said grooving means for engagement with the peripheral edges of the grooved stock, and a fluid pressure device adapted to advance or retract said chamfering tool relative to the stock and to said grooving means.

6. In a machine for making chamfered forging blanks, means for supporting and rotating a length of solid stock, means for transversely grooving the stock to partially sever same into blanks, a fluid operated chamfering tool portably mounted on top of said grooving means adapted for yielding engagement with the peripheral edges of the grooved stock, and means for retracting said chamfering tool relative to said stock.

7. In a machine for making chamfered forging blanks from elongated, eccentric, round stock, means for rotating said stock, means for transversely grooving the stock to partially sever the same into blanks, a fluid pressed chamfering tool portably mounted on top of said grooving means and cooperating therewith for engagement with the edges of the material formed by said grooves, said tool being adapted to advance and recede in accordance with the eccentricity of the stock, and pressure control means for rendering said tool inoperative before said grooving is completed.

ALOIS ROZMARICH.